Dec. 8, 1970  A. H. RICH  3,546,473

OCEANOGRAPHIC GENERATOR

Filed Feb. 24, 1969

INVENTOR
ALAN H. RICH

BY
ATTORNEY

10

United States Patent Office 3,546,473
Patented Dec. 8, 1970

3,546,473
OCEANOGRAPHIC GENERATOR
Alan H. Rich, 9910 Jacqueline Drive,
Oxon Hill, Md. 20021
Filed Feb. 24, 1969, Ser. No. 801,646
Int. Cl. F03b *13/12*
U.S. Cl. 290—42                                9 Claims

ABSTRACT OF THE DISCLOSURE

The invention consists of a device for generating electrical energy by utilizing the motion of the surface of a body of water. It comprises two floats, one which follows the displacement of the water surface and another which remains in a substantially stable position independent of the motion of the water. By attaching a permanent magnet and a coil to the floats, an electromotive force can be induced in the coil upon the occurrence of relative motion between the floats.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention consists generally of apparatus for generating electrical energy by utilizing the motion of the surface of a body of water.

Some common uses for unmanned buoys or flotation devices are for the remote monitoring of weather, as aids to navigation and in the tracking of objects in the sea. The electronic equipment used for these operations require power sources which do not appreciably deteriorate over extended periods of use on the surface of the sea. Several types of power sources are commonly employed to operate such equipment including batteries, fuel cells and solar cells. All such devices however have the obvious drawback of deteriorating after extended use. It would therefore be highly desirable to have a source of electrical energy which would not deteriorate with time and which could constantly recharge itself by means of the inherent motion of the surrounding surface water.

OBJECTS OF THE INVENTION

It is therefore an object of the invention to provide a means for generating electrical energy by utilizing the natural motions of the surface of the sea.

A further object is to provide a source of electrical energy capable of operating efficiently over an extended period of time.

Still another object of the invention is to provide electrical energy by utilizing simple, dependable and inexpensive components.

SUMMARY OF THE INVENTION

These and other objects of the invention are accomplished by means of apparatus consisting of a permanent magnet attached to a spar buoy thereby remaining in a substantially constant position in the water regardless of surface motion and a wire coil contained in a flotation device which follows the surface motion. It is the reciprocating motion of the coil cutting the stationary magnetic field set up by the magnet which generates the electrical energy.

BRIEF DESCRIPTION OF THE DRAWINGS

The invention will be more fully described in relation to the drawings in which.

DETAILED DESCRIPTION OF THE INVENTION

Figure 1:
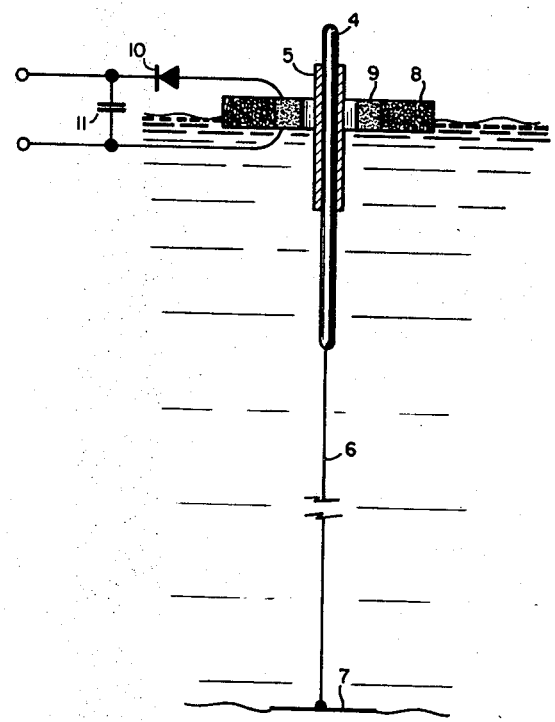
FIG. 1 shows the principal embodiment of the invention.

With reference to FIG. 1, the invention comprises a circular flotation device 8 which could be made of either a gas inflatable fabric or could be composed of a material of appropriate density to float on the surface of the water. The flotation device 8 would advantageously have a large surface area in contact with the water thereby enabling it to follow the wave motion of the ocean surface in an approximately reciprocating motion. Enclosed within the flotation device 8 is a coil of wire 9 with the ends of the coil available for the connection of electronic components thereof. The coil would advantageously have a high number of turns and be composed of a material commonly used for such purpose by those skilled in the art. A spar buoy 4 is located inside the circular float 8 and is constructed such that its vertical position in the water remains substantially constant regardless of the motion of the surface. Buoys of this type are commonly known to those skilled in the art. Any other device could be substituted for the spar buoy so long as it performed the like function of remaining stable regardless of surface motion. Attached to the spar buoy 4 is a permanent magnet 5. The magnet 5 is located in relation to the coil 9 such that the coil will move vertically relative to the magnet in response to the motion of the water surface. A chain 6 attached to a damper plate 7 is used to help stabilize the spar buoy 4.

The device operates in the following manner. The permanent magnet sets up a magnetic field with flux lines emanating from its north pole and continuing on to its south pole. These flux lines will pass through the coil 9 contained in the float 8. When the coil moves vertically with the motion of the surface the number of flux lines cut by the coil will vary, thereby inducing an E.M.F. in the coil. A diode 10 and capacitor 11 are used to close the coil circuit thereby causing a current to charge the capacitor. Thus each upward swing of the float allows a charge to flow into capacitor 11. The capacitor 11 can be utilized as a source of electrical energy to operate various electronic oceanographic equipment. As an alternative arrangement the generated current may be used to charge a battery during turbulent periods. In this manner a source of energy would be available during periods of calm when a smaller charging current is being generated.

The invention has been described in regard to a circular shaped float circumscribing a permanent magnet however one skilled in the art would recognize that any contiguous relationship such that the flux emanating from the magnet will cut the coil, is all that is essential. Various shaped floats could be employed equally well.

Figure 2:
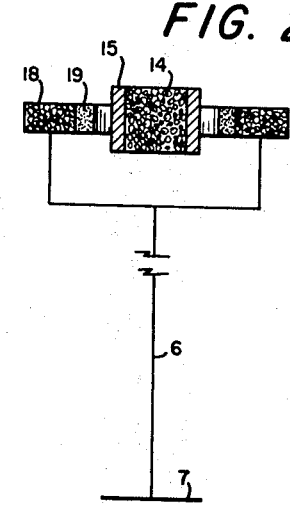
FIGS. 2 and 3 show alternative embodiments of the invention arrived at by interchanging the positions of the elements.
Figure 3:
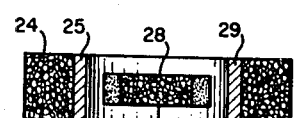

Thus in FIG. 2 it is seen that the magnetic material 15 can be attached to a float 14 which follows the surface motion but is located on the inside of the stable position flotation device 18 which contains a coil 19. Note that the anchoring chain 6 is now attached to stabilize the outer flotation device. Also in FIG. 3 it is seen that the permanent magnets 25 are attached to an outer ring 24 which follows the surface motion. An inner flotation device 28 contains the electrical conducting coil 29 and remains stable independent of surface motion. The anchoring chain 6 helps stabilize the inner buoy 28. In any of the alternative embodiments the diode and capacitor shown in FIG. 1 or suitable alternative arrangements are used to generate a charging current which can operate the electronic equipment.

From the foregoing illustrations it is apparent that many variations are possible which incorporate the basic principle of the invention. The size and number of magnets used, the type and quantity of coils employed and the relative placement, shapes and sizes of the flotation devices are all a matter of design choice.

What is claimed and desired to be secured by Letters Patent of the United States is:

1. A device for generating an electromotive force by utilizing the motion of the surface of a body of water comprising:
    first flotation means on said surface for following the motion of said surface;
    second flotation means on said surface adjacent said first flotation means for remaining in approximately constant vertical position in the water independent of said surface motion; and
    means coupled to said first and second flotation means for generating an electromotive force upon the relative movement of said first and second flotation means.

2. The device as recited in claim 1 wherein:
    said means coupled to said first and second flotation means comprises a permanent magnet and an electrical conductor.

3. A device as recited in claim 2 wherein said electrical conductor comprises an electrical winding coupled to said first flotation means and wherein said permanent magnet is attached to said second flotation means and located such that flux lines generated by said magnet intersect said windings.

4. The device as recited in claim 3 wherein:
    said first flotation means circumscribes said second flotation means, and
    wherein said electrical windings form a coil inside of said first flotation means.

5. The device as recited in claim 3 wherein:
    said first flotation means is toroidal shaped and said second flotation means is coaxially located within said first flotation means.

6. A device as recited in claim 2 wherein said electrical conductor comprises an electrical winding coupled to said second flotation means and wherein said permanent magnet is attached to said second flotation means and located such that flux lines generated by said magnet intersect said windings.

7. The device as recited in claim 6 wherein:
    said second flotation means circumscribes said first flotation means, and
    wherein said electrical windings form a coil inside said first flotation means.

8. The device as recited in claim 6 wherein said second flotation means is toroidal shaped and said first flotation means is located coaxially within said second flotation means.

9. A device as recited in claim 3 including a deeply submerged damper plate attached to said second flotation means to maintain said second flotation means in constant vertical position.

References Cited

UNITED STATES PATENTS

| | | | |
|---|---|---|---|
| 2,127,847 | 8/1938 | Schulte | 290—54X |
| 3,231,749 | 1/1966 | Hinck | 290—53 |
| 3,362,336 | 1/1968 | Kafka | 290—42X |

G. R. SIMMONS, Primary Examiner

U.S. Cl. X.R.

290—53